United States Patent
Yuguchi

(10) Patent No.: US 9,846,061 B2
(45) Date of Patent: Dec. 19, 2017

(54) OPTICAL DISPLACEMENT SENSOR HAVING A LIGHT RECEIVING LEVEL UPPER LIMIT VALUE SPECIFYING UNIT

(71) Applicant: SICK OPTEX CO., LTD., Kyoto (JP)

(72) Inventor: Tasuku Yuguchi, Kyoto (JP)

(73) Assignee: SICK OPTEX CO., LTD., Kyoto (JP)

(*) Notice: Subject to any disclaimer, the term of this patent is extended or adjusted under 35 U.S.C. 154(b) by 137 days.

(21) Appl. No.: 15/044,698

(22) Filed: Feb. 16, 2016

(65) Prior Publication Data
US 2016/0252370 A1 Sep. 1, 2016

(30) Foreign Application Priority Data
Feb. 26, 2015 (JP) ................... 2015-036754

(51) Int. Cl.
G01J 1/42 (2006.01)
G03B 7/083 (2006.01)
G01D 5/34 (2006.01)
G01B 11/14 (2006.01)

(52) U.S. Cl.
CPC .............. *G01D 5/34* (2013.01); *G01B 11/14* (2013.01); *G01J 1/4209* (2013.01)

(58) Field of Classification Search
CPC .......... H04N 5/353; G03B 7/083; G01D 5/34; G01J 1/4209
USPC ........................................ 250/214 R, 208.1
See application file for complete search history.

(56) References Cited

U.S. PATENT DOCUMENTS 8,072,524 B2 * 12/2011 Miyatake ............... H04N 3/155
348/308
2005/0253944 A1 11/2005 Olsen et al.

FOREIGN PATENT DOCUMENTS

| JP | H01-093966 A | 4/1989 |
| JP | 2005-326340 A | 11/2005 |
| JP | 2010-223950 A | 10/2010 |

OTHER PUBLICATIONS

The extended European search report issued by the European Patent Office dated Jul. 19, 2016, which corresponds to European Patent Application No. 16157326.6-1568 and is related to U.S. Appl. No. 15/044,698.

* cited by examiner

*Primary Examiner* — Que T Le
(74) *Attorney, Agent, or Firm* — Studebaker & Brackett PC

(57) ABSTRACT

The present invention includes an imager 1 having an automatic exposure stopping function, which are implemented therein, and includes an exposure time measuring unit 24 to measure the exposure time from the start of exposure to the stopping of exposure in the imager 1, a measurement distance calculating unit 21 to calculate the measurement distance to an object M on the basis of a displacement of the light receiving position in the imager 1, and a data output/storage unit 25 to output and/or store, as data related with acquisition of a distance actual value, which is an actual distance to the object, in a condition in which the measured exposure time and the measurement distance calculated with this exposure time are associated with each other.

3 Claims, 15 Drawing Sheets

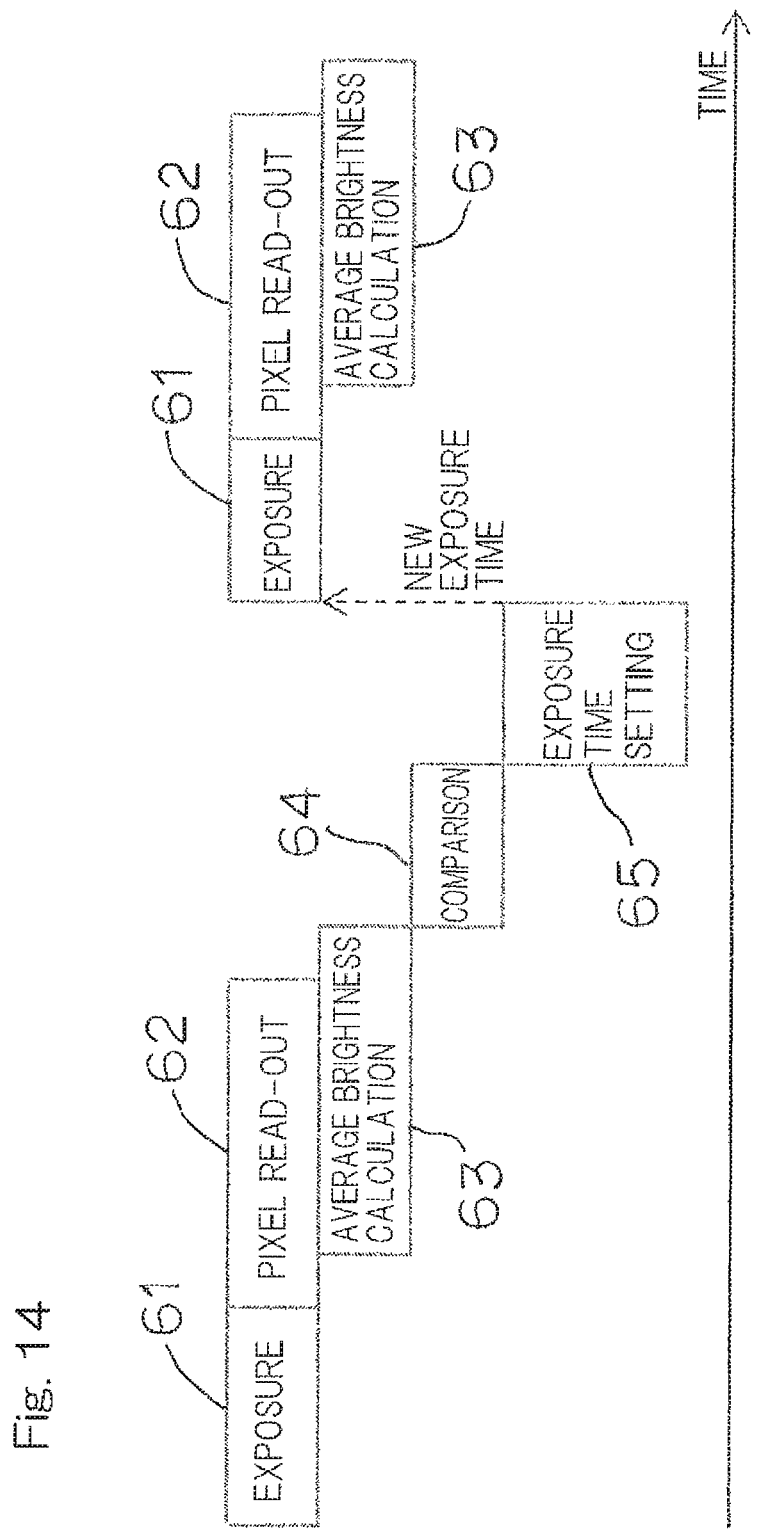

US 9,846,061 B2

OPTICAL DISPLACEMENT SENSOR HAVING A LIGHT RECEIVING LEVEL UPPER LIMIT VALUE SPECIFYING UNIT

CROSS REFERENCE TO THE RELATED APPLICATION

This application is based on and claims Convention priority to Japanese patent application No. 2015-036754, filed Feb. 26, 2015, the entire disclosure of which is herein incorporated by reference as a part of this application.

BACKGROUND OF THE INVENTION

Field of the Invention

The present invention relates to an optical displacement sensor equipped with an imager having an automatic exposure stopping function of automatically stopping the exposure of a pixel receiving the light.

Description of Related Art

The automatic exposure function currently implemented in the conventional imaging device is so designed as to set the exposure time for the subsequent shooting by performing such a calculation as that of the average brightness of the entire pixels or the average brightness of specific pixels through processing of an image that has been shot and depending on difference between the calculation result and a target value.

FIG. 13 of the accompanying drawings illustrates a structural diagram showing the automatic exposure function implemented in the conventional imaging device and FIG. 14 thereof illustrates a time chart showing the operation of the automatic exposure function shown in FIG. 13. Referring to FIG. 13, in response to the light reflecting from a target or an object M and subsequently received by a pixel, the light is received by a group of pixels for a constant exposure time and, subsequent to read-out from a pixel read-out unit 52, the average brightness is calculated by an average brightness calculation unit 53. The average brightness so calculated and a target value of a target average brightness unit 55 are compared with each other by a comparator 54 so that the exposure time is set by a subsequent exposure time setting unit 56. If the average brightness is lower than expected, the exposure time is set to longer time and the average brightness is higher than expected, the exposure time is set to shorter time. Instead of the average brightness, the peak brightness is occasionally used. As shown in FIG. 14, exposure 61 • pixel read-out 62 and the average brightness calculation 63 are executed, comparison 64 and exposure time setting 65 are executed and, under a new exposure time, the exposure 61 • the exposure element read out 62, the average brightness calculation 63, the comparison 64 and the exposure time setting 65 are repeated. As discussed above, since the conventional automatic exposure function includes read-out of the pixel (image) that has been exposed (shot) and the subsequent exposure time is set after the calculation process, problems have been recognized that the exposure time is unable to follow perfectly in the event that the light reflecting level of the object changes dynamically, and the image temporarily underexposed or overexposed is unusable.

In order to improve those problems, the patent document 1 listed below, for example, discloses an imager of a kind having an automatic exposure stopping function with which exposure or light emitting is stopped when a peak value of the light receiving level is detected. With this known imager, since the exposure is stopped at the moment the light receiving level reaches a specified level, such a problem with a less light receiving level or saturation can be avoided.

PRIOR ART LITERATURE

Patent Document 1: JP Laid-open Patent Publication No. H01-93966

DISCLOSURE OF THE INVENTION

It has, however, been found that the above discussed conventional technology has a problem that, although measurement is possible when the light reflecting level of the object is high, no actual measurement value can be provided as a result of increase in measurement error. By way of example, assuming that the distance of an object M, which is moving and having been placed on an object (background) T such as, for example, a transport unit as shown in FIG. 15A, is to be measured, it may occur that when a sender light spot having a finite size from a displacement sensor is applied on a boundary line between the object M and the object T having respectively different reflectance as shown in FIG. 15B, light is received with light from a background T of a high reflectance enhanced.

In other words, in FIG. 15B, a left half of the sender light spot is shot by an imager of the displacement sensor and a right half thereof, which is low in light reflectance, is scarcely shot. As a result thereof, unlike the image shot during the usual time, measurement takes place with the background of the high light reflectance and, therefore, a measurement error is brought about due to that influence and the actual measurement value is not provided. Also, it may occur that the measurement error under the influence of ambient light around the object to be measured may result in.

In view of the foregoing, the present invention is intended to provide an optical displacement sensor capable of accomplishing measurement even though the light reflecting level from an object changed dramatically and also to provide an actual measurement value containing no measurement error that results from the change in light reflecting level.

In order to accomplish the foregoing object, the present invention provides an optical displacement sensor including an imager having multiple pixel blocks. Each of the pixel blocks includes a group of pixels to receive light from an object, a light receiving level upper limit value specifying unit to specify a light receiving level upper limit for all of the pixels, and multiple comparators to compare the specified upper limit value with the light receiving level of each pixel during exposure. The imager further includes a logic circuit to logically add an output of each of the comparators, and is operable to stop exposure of all of the pixels in accordance with a result of calculation of the logical add. The optical displacement sensor further includes an exposure time measuring unit in the imager to measure an exposure time from a start of exposure to stopping of the exposure, a measurement distance calculating unit to calculate a measurement distance to the object by reading out from the pixel data of a light receiving position in the imager, and a data output/storage unit to output and/or store, as data related with acquisition of a distance actual value, which is an actual distance to the object, in a condition in which the measured exposure time and the measurement distance calculated with this exposure time are associated with each other.

According to the present invention, since the outputting and/or storage is/are made while the measured time and the measurement distance calculated with this exposure time are associated with each other, the distance actual value, which is the actual distance to the object can be measured. Accordingly, measurement can be accomplished even though the light reflecting level from the object changes dramatically and acquisition of the actual measurement value, which is free from any measurement error brought about by the change of the light reflecting level, can be made possible easily. Also, since using the imager having the automatic exposure stopping function, the light receiving level of the pixel in the imager during the exposure is monitored, the exposure is stopped instantaneously at the time any pixel reaches a preset light receiving level, and the maximum brightness in the pixel can be made constant, a proper image can be provided without generating neither overexposure nor underexposure, even when the light reflecting level of the object changes dramatically. Further an analysis of a factor resulting in such measurement error can be accomplished.

In one preferred embodiment of the present invention, the optical displacement sensor may also include a distance actual value measuring unit to measure a distance actual value which is the actual distance to the object, the distance actual value measuring unit being operable to measure the distance actual value by invalidating the calculated measurement distance corresponding to such measured exposure time in the event that the measured exposure time, when compared with the previous value to calculate a difference, is higher than a specified value, but by enabling the calculated measurement distance corresponding to the previous exposure time. Accordingly, the actual measurement value, which is free from any measurement error brought about by the change of the light reflecting level, can be easily measured even though the light reflecting level from the object changes dramatically.

In a further preferred embodiment of the present invention, The optical displacement sensor may further include a distance actual value measuring unit to measure a distance actual value which is the actual distance to the object, the distance actual value measuring unit being operable to measure a distance actual value by reducing the moving average cycles of multiple measurement distances, in the event that the exposure time so measured, when compared with the previous value to calculate a difference thereof, is greater than the specified value. In this case, even though the light reflecting level from the object changes dramatically, not only can the actual measurement value be easily measured, but also the measurement response time of the object can be sped up.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 14 is a time chart showing the operation of FIG. 13; and

DESCRIPTION OF PREFERRED EMBODIMENTS

Figure 1:
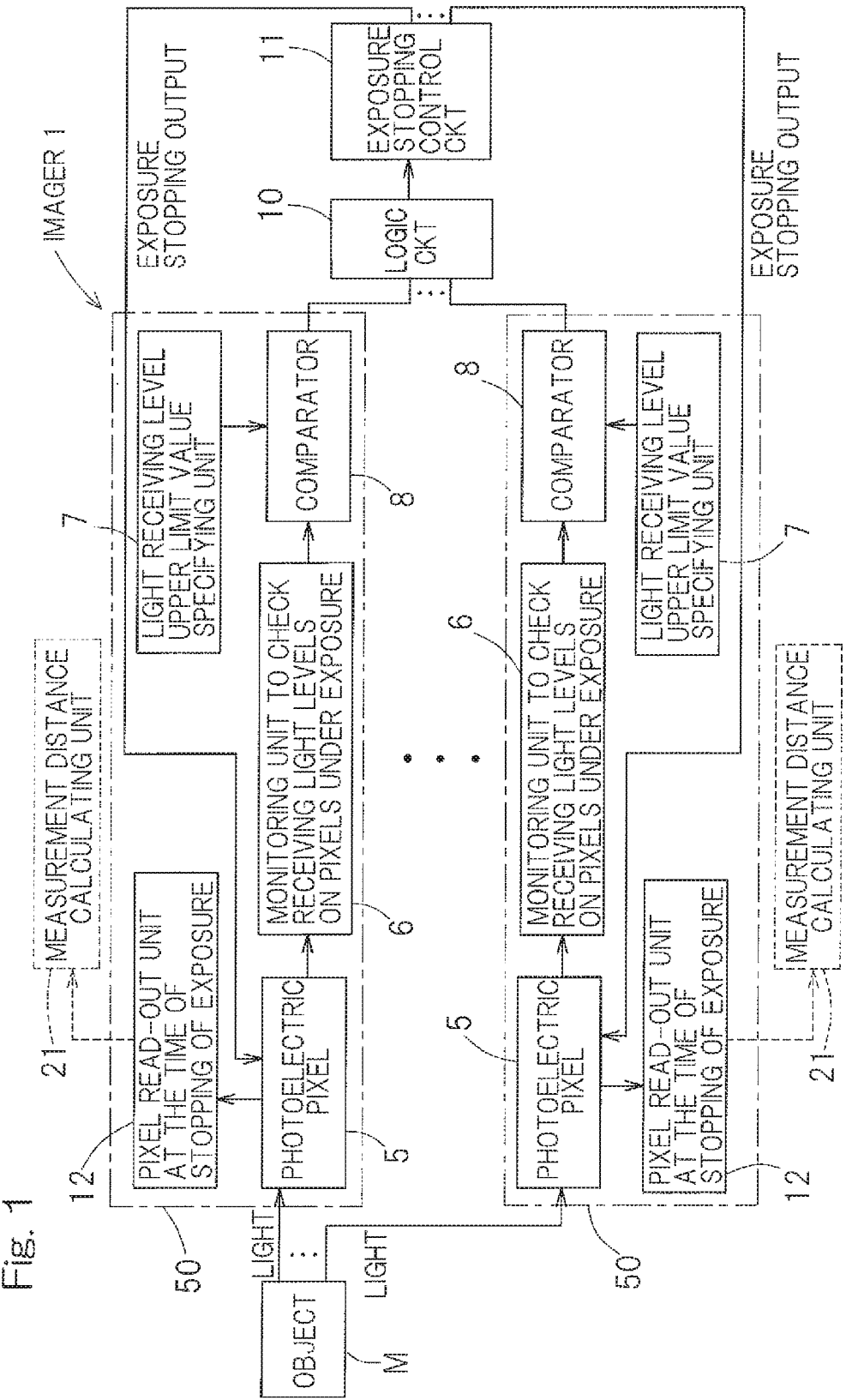
FIG. 1 is a block diagram showing an imager having an automatic exposure stopping function, which pixel is contained in an optical displacement sensor designed in accordance with a preferred embodiment of the present invention.

Hereinafter, a preferred embodiments of the present invention will be described in detail with particular reference to the accompanying drawings. In particular, FIG. 1 is a block diagram showing an imager 1 having an automatic exposure stopping function, which pixel is contained in an optical displacement sensor designed in accordance with the preferred embodiment of the present invention. This imager 1 has pixel blocks 50. Each of the pixel blocks 50 includes a group of pixels 5, which is comprised of multiple pixels for receiving light from an object M and also includes a light receiving level monitoring unit 6 for monitoring a light receiving level of each of the pixels 5 under exposure; a light receiving level upper limit value specifying unit 7 for specifying the light receiving level upper limit value of each of the pixels 5; multiple comparators 8 each operable to compare the light receiving level of the respective pixel 5 during the exposure with the upper limit value so specified; and a pixel read-out unit 12 for reading out the pixels at the time of the exposure stopping. The imager 1 further includes a logic circuit 10 for providing a logical add of respective outputs of the comparators 8; and an exposure stopping control circuit 11 for stopping exposures of all of the pixels immediately without setting an exposure time in the event that, in accordance with a calculation result which has been logically added, the light receiving level of one of the pixels exceeds the upper limit value so specified. Based on the read-out of the pixels at the time of the exposure stopping, a measurement distance to the object M is calculated by a measurement distance calculating unit 21 as will be discussed later.

Figure 2:
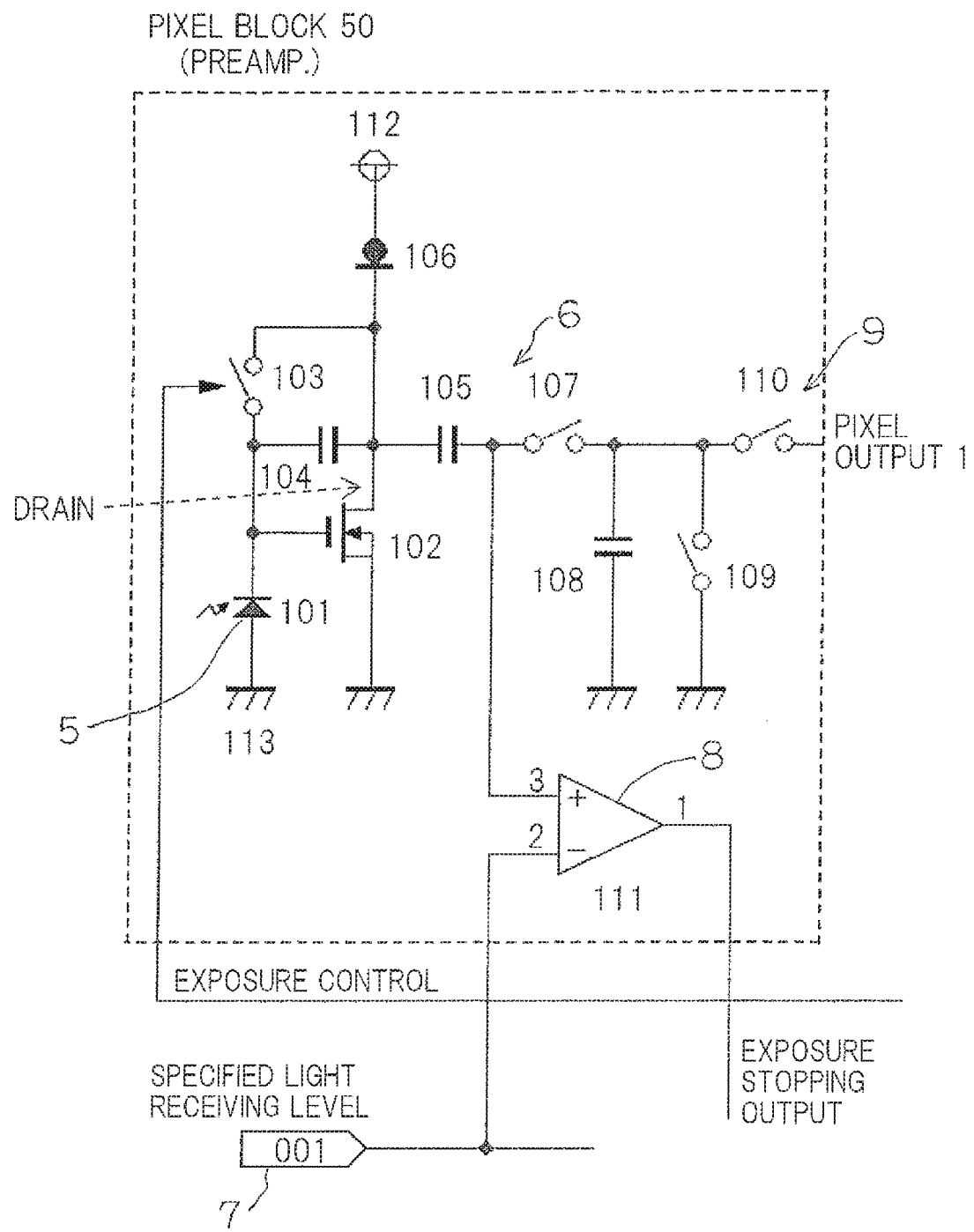
FIG. 2 is a circuit diagram showing the imager shown in FIG. 1.

FIG. 2 illustrates a detailed circuit diagram of the imager 1 having the automatic exposure stopping function. In this figure, only one of the pixel blocks 50 is shown by way of example. A constant current circuit 106 is provided between a power source (+) 112 and a drain of an amplifier transistor 102. The light receiving pixel 101 (5) is a photoelectric pixel capable of converting light from the object M such as, for example, a photo-diode (PD) into an electric signal and an electric current then carrying changes in dependence on the light intensity. The amplifier transistor 102 is implemented in the form of, for example, MOSFET. Prior to the start of exposure, an exposure control switch 103 is first turned on to allow a charge of a charge accumulating capacitor 104 to be discharged and, also, an amplified signal transfer switch 107 is turned on, a hold capacitor discharge switch 109 for a hold capacitor 108 is turned on and an output transfer switch 110 is turned off to allow a charge of an amplified signal coupling capacitor 105 to be discharged. Since a very small leakage current temperature dependent exists in total darkness, it may occur that the drain voltage of the amplifier transistor 102 is changed, the amplified signal coupling capacitor 105 is implemented to ignore the increase of such drain voltage of the amplifier transistor 102. In practice the exposure control switch 103 and others are each implemented in the form of a semiconductor switch, for example, a transistor.

In a light receiving level monitoring unit under exposure 6, at the time of the start of exposure, the exposure control switch 103 is turned off, the amplified signal transfer switch 107 is turned on, the hold capacitor discharge switch 109 is turned off and the output transfer switch 110 is turned off. Then, the electric current carrying through the light receiving pixel 101 is accumulated in the charge accumulating capacitor 104 and voltage level of the charge accumulation capacitor 104 increases. At this time, the voltage at a gate of the amplifier transistor 102 is lowered followed by switching off thereof and, since the drain current of the amplifier transistor 102 decreases, the drain voltage increases, and the voltage at a terminal 3 of a comparator 111 (8) is also increased.

When the voltage at the terminal 3 of the comparator 111 becomes higher than the voltage at a terminal 2, the output voltage at the terminal 1 increases. The voltage at the terminal 2 is specified a light receiving level upper limit value by a light receiving level upper limit value specifying unit (specified light receiving level) 7. Upon detection of increase of an output, that is, an output voltage at a terminal 1 of the comparator 111, the exposure stopping control circuit (control circuit) 11, shown in FIG. 1, provides an exposure stopping output to thereby cause exposure of the light receiving pixel 101 to stop. At the time of stopping of the exposure, the amplified signal transfer switch 107 is turned off and the output transfer switch 110 is turned on to enable the light receiving level immediately before the stopping of the exposure, then stored in the hold capacitor 108, that is, a pixel output voltage equivalent to the specified light receiving level to be provided.

Figure 3:
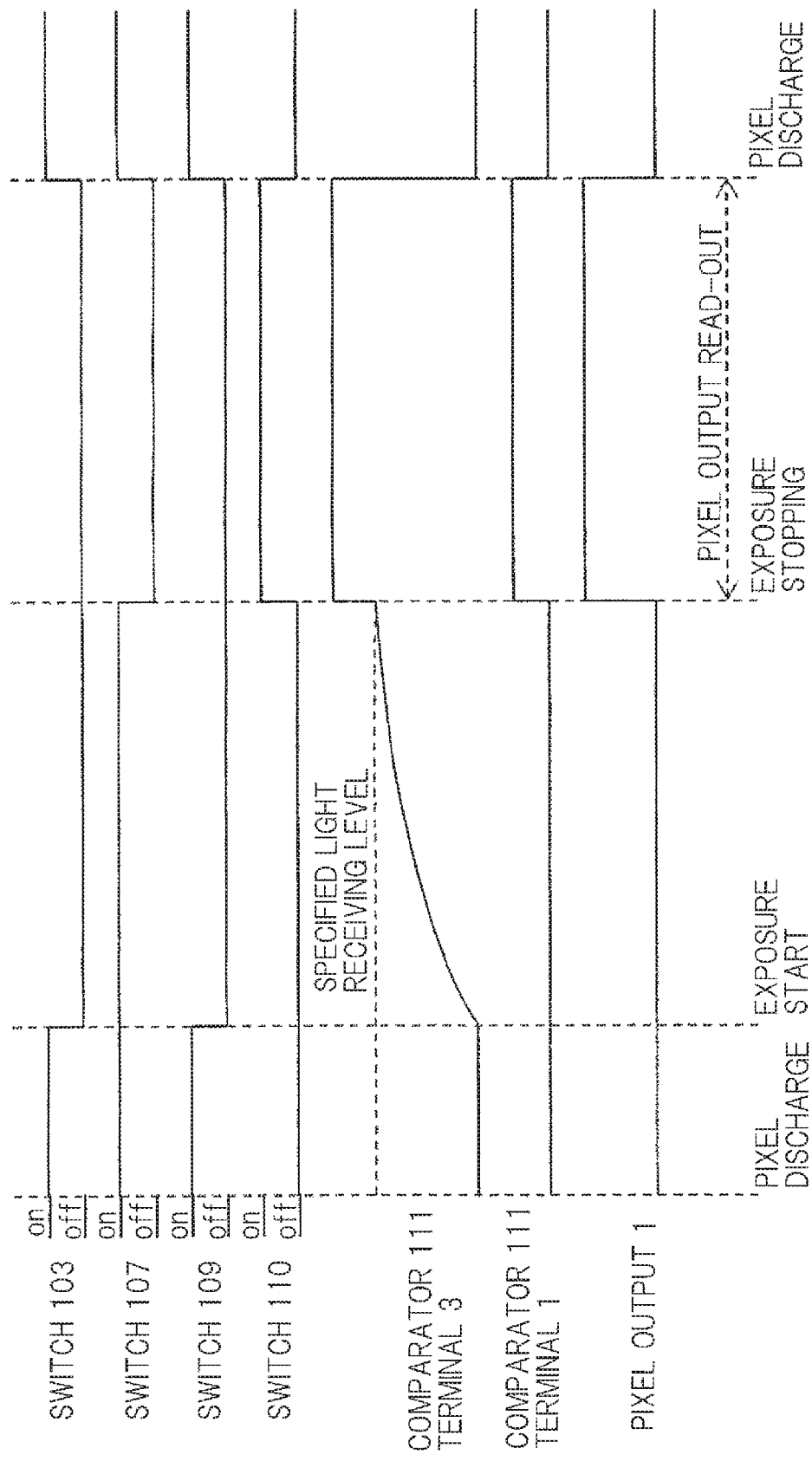
FIG. 3 is a time chart showing the operation of the imager shown in FIG. 1.
Figure 4:
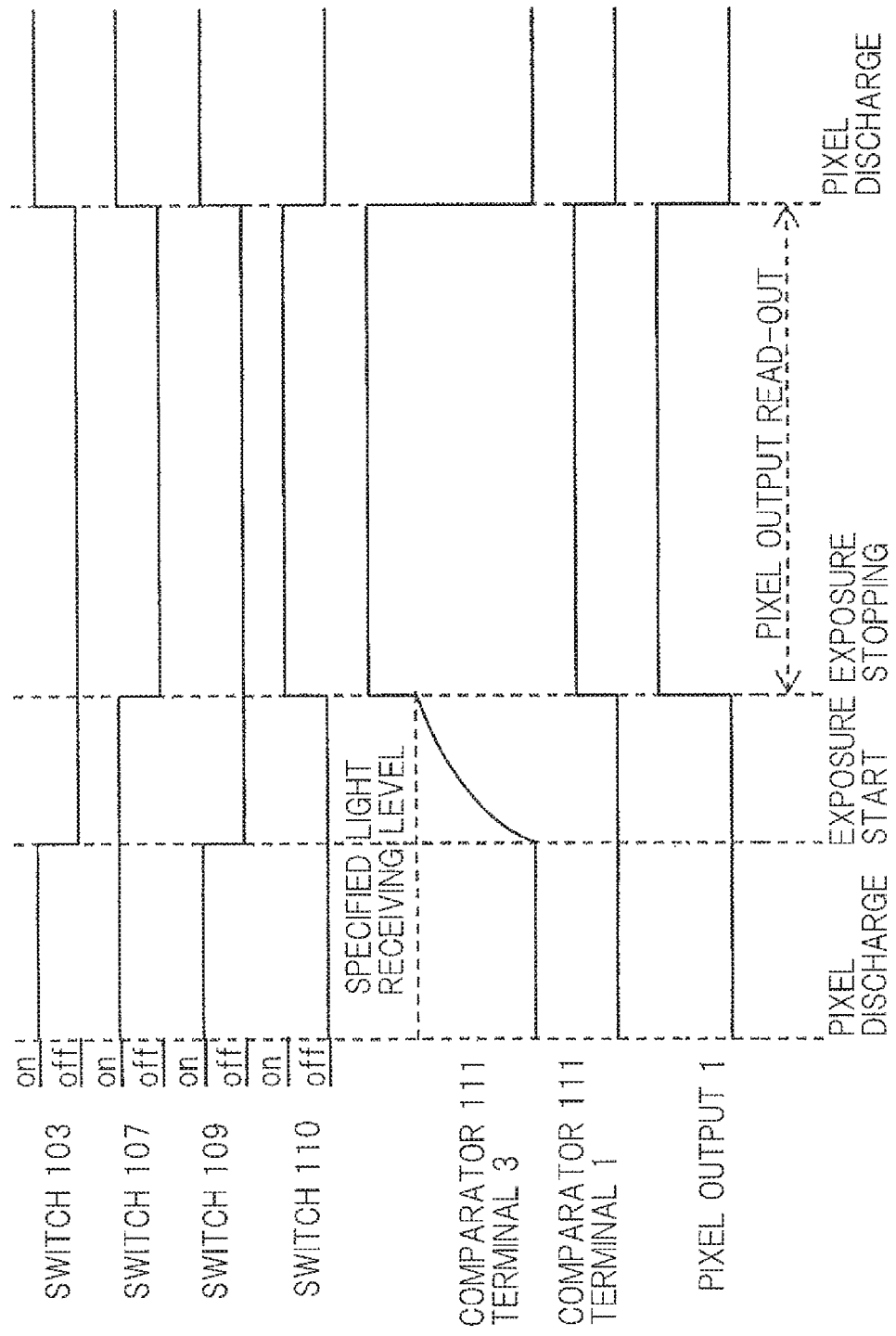
FIG. 4 is a time chart showing the operation of the imager shown in FIG. 1.
Figure 5:
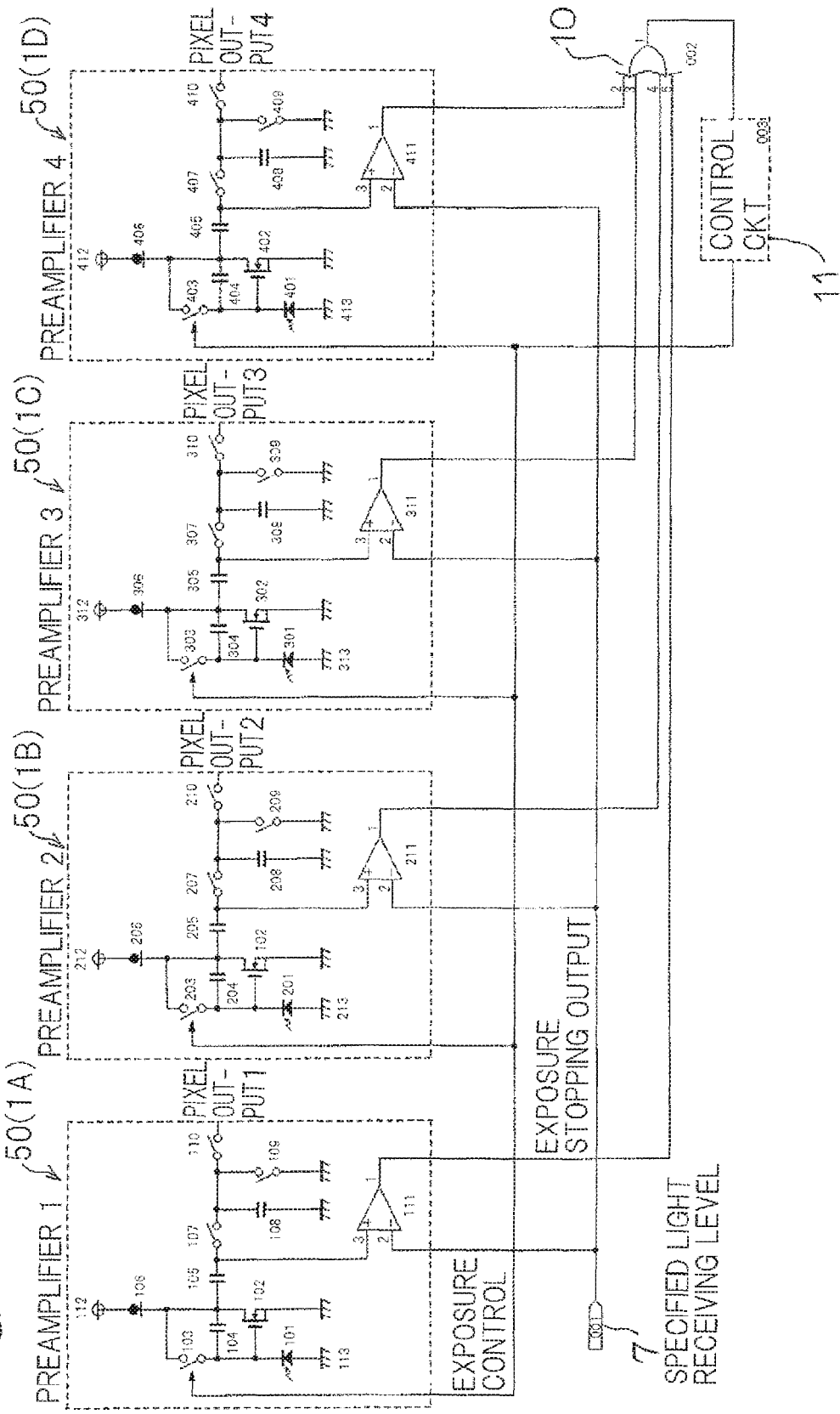
FIG. 5 is a circuit diagram showing the case in which multiple pixels are used.

The timing diagram of that is shown in FIGS. 3 and 4. FIG. 3 is the case in which the time interval from the start of exposure to the stopping of exposure is long because light on the light receiving pixel 101 is weak and capacitor is charged slowly, and FIG. 4 is the case in which since the light is strong and the capacitor is charged faster, the time interval between the start of exposure to the stopping of exposure is short. FIG. 5 illustrates an arrangement of a plurality of, for example, four (1A~1D) pixel blocks 50 in one dimensional plane and, in this example, a single light receiving level upper limit value specifying unit (specified light receiving level) 7 is implemented. Although in this example the four pixel blocks 50 have been shown and described as implemented, the present invention is not necessarily limited thereto and 512 pixel blocks may be arranged, for example, in a row or in two dimensional planes.

Figure 6:
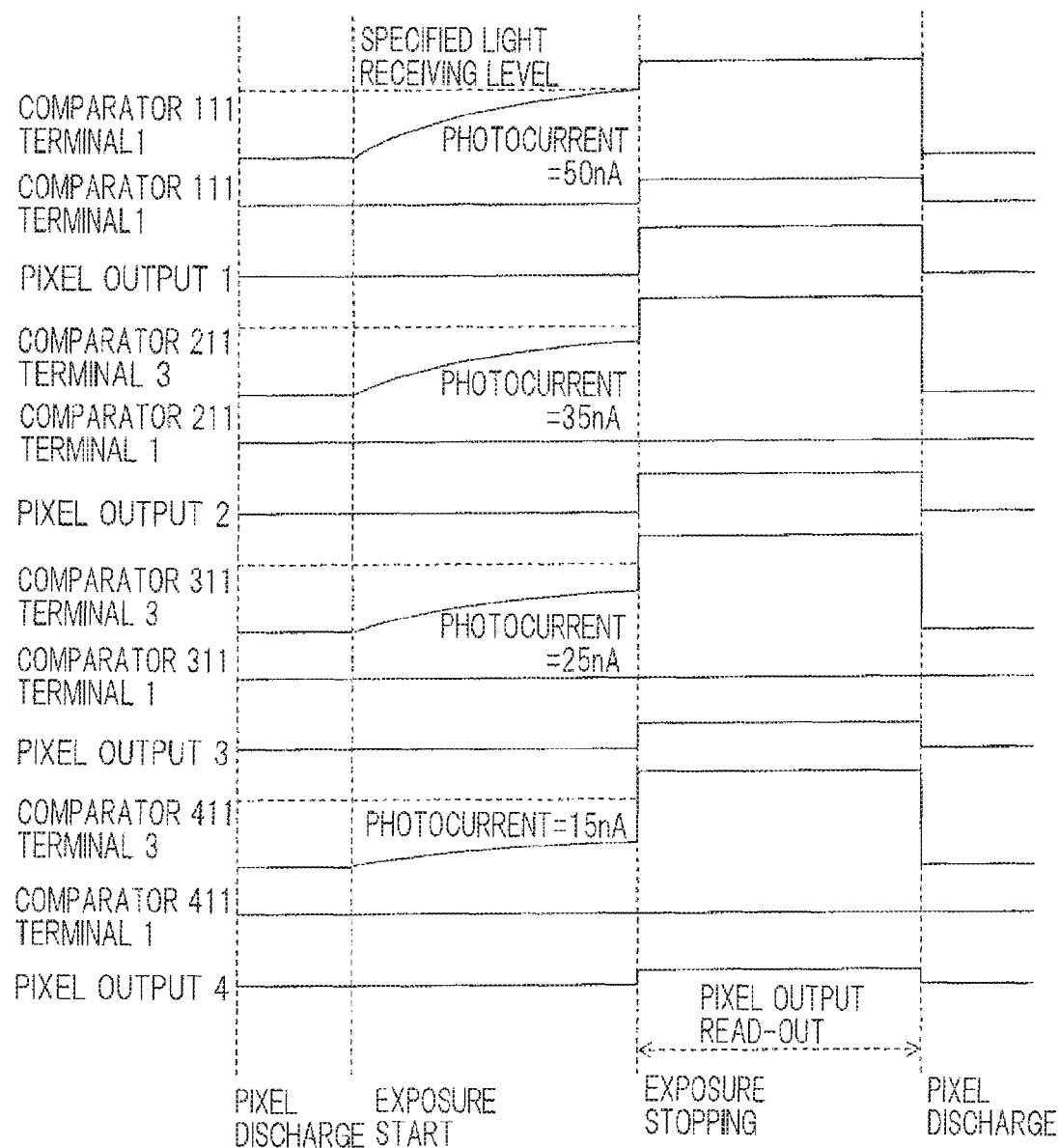
FIG. 6 is a time chart showing the operation of FIG. 5.

FIG. 6 is a time chart showing the operation of FIG. 5. For example, a pixel output 1 of the imager 1A represents the highest value (peak level), sequentially followed by a pixel output 2, a pixel output 3 and a pixel output 4 which respectively represent relatively low values in the order given above.

In this way, since using the imager 1 having the automatic exposure stopping function, the light receiving level of the pixel in the imager 1 during the exposure is monitored, the exposure is stopped instantaneously at the time any pixel reaches a preset light receiving level, and the maximum brightness in the pixel can be made constant, a proper image can be provided without generating either overexposure nor underexposure, even when the light reflecting level of the object M changes dramatically.

Figure 7:
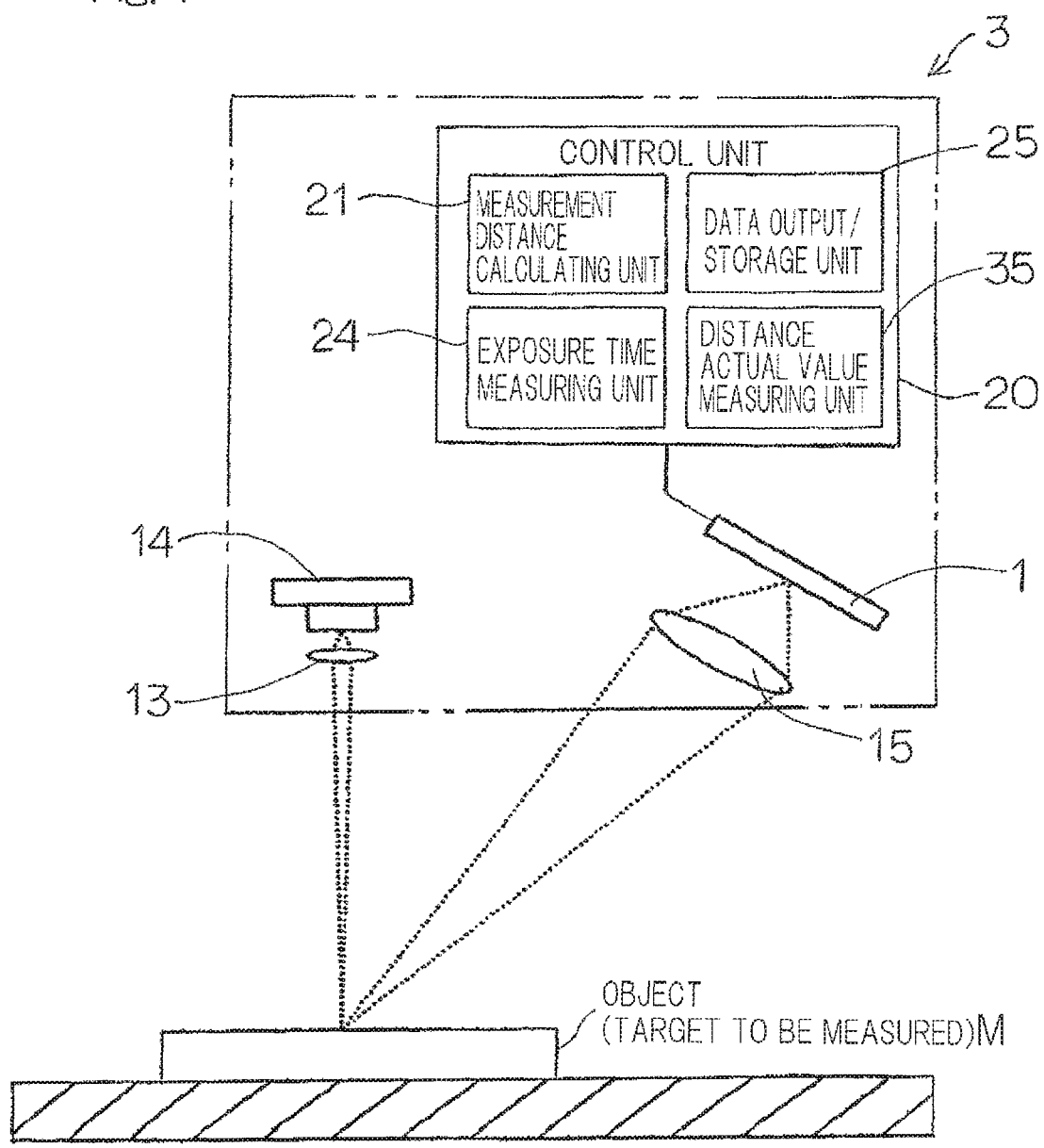
FIG. 7 is a structural diagram showing the optical displacement sensor designed in accordance with the preferred embodiment of the present invention.

FIG. 7 is a structural diagram showing the optical displacement sensor according to the preferred embodiment of the present invention, which element contains the above described imager. The optical displacement sensor, now identified by 3, is of a structure that makes it possible to measure the distance to the object (target to be measured) M even when the light reflecting level of the object M changes dramatically, and is equipped with an imager 1 such as, for example, a photo-diode (PD) located therein, a light receiving lens 15, an imaging device 3 having a sender light unit 14 such as, for example, a laser diode (LD) capable of emitting light onto the object M to be measured though a sender lens 13, and a control unit 20 for controlling the entire system.

The control unit 20 includes a measurement distance calculating unit 21 (shown by the broken line in FIG. 1) for calculating the distance to the object M by using, for example, a triangular distance measuring method on the basis of the light receiving data outputted from the imager 1 which receives light emitted towards and subsequently reflected from the object M.

The control unit 20 referred to above also includes an exposure time measuring unit (exposure time measuring counter) 24 for measuring the exposure time from the start of exposure to the stopping of exposure; a data output/storage unit 25 for outputting and/or storing, as data related with acquisition of a distance actual value, which is an actual distance to the object M to be measured, in a condition in which the measured exposure time and the measurement distance calculated simultaneously with this exposure time are associated with each other; and a distance actual value measuring unit 35 for measuring the distance actual value which is the actual distance to the object M to be measured. This distance actual value measuring unit 35 measures the distance actual value by invalidating the calculated measurement distance corresponding to such measured exposure time in the event that the measured exposure time, when compared with the previous value, is higher than a specified value, but by enabling the calculated measurement distance corresponding to the previous exposure time.

As discussed above, the imager 1 can accomplish the measurement without generating either overexposure or underexposure even though the light reflecting level of the object M undergoes a considerable change, but it may occur that no actual measurement value can be provided depending on the object M. Unlike the conventional displacement sensor, the optical displacement sensor 3 of the present invention is capable of measuring the actual measurement value free from a measurement error brought about by the change in light reflecting level even though the light reflecting level from the object M to be measured changes dramatically. Hereinafter, the details of this optical displacement sensor 3 will be described.

Figure 8:
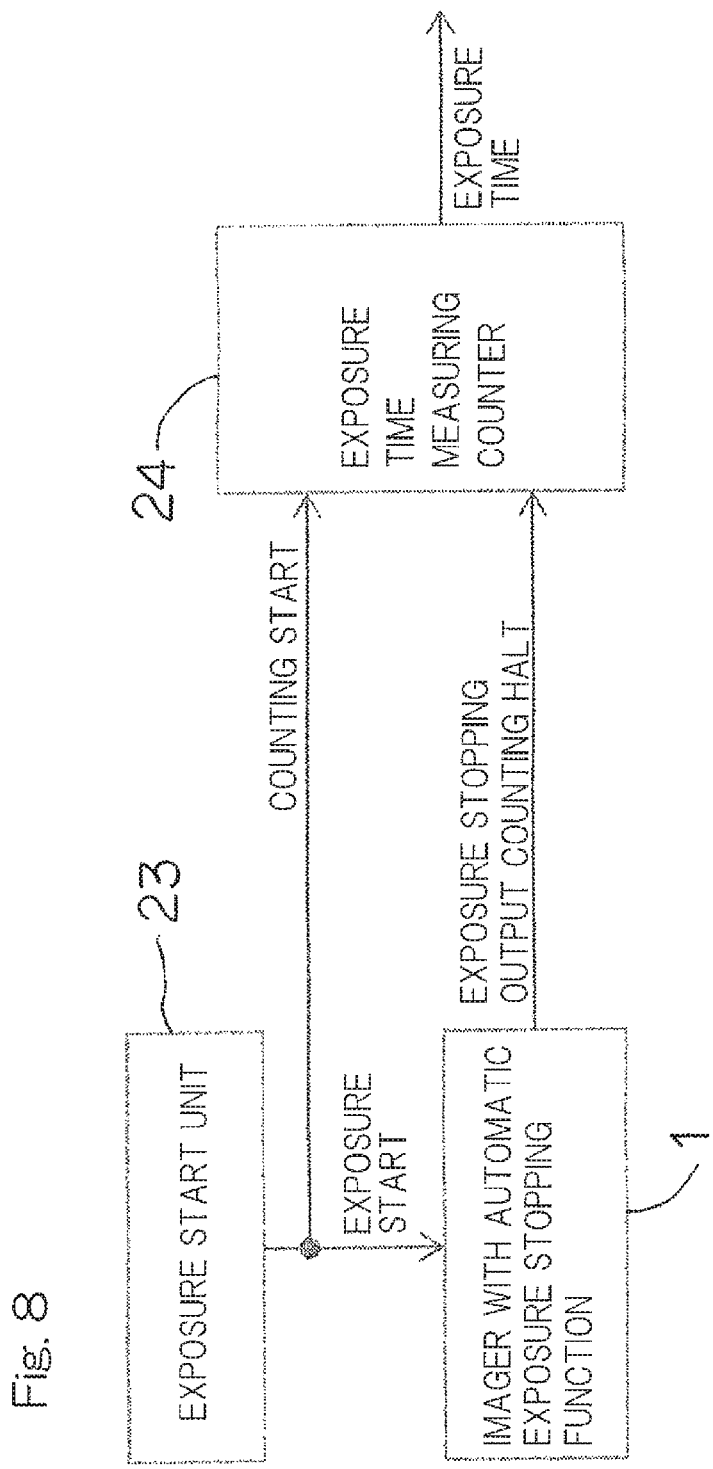
FIG. 8 is a block diagram showing a condition in which the exposure time is measured.

FIG. 8 is a block diagram showing a condition for measuring the exposure time. As shown in FIG. 8, the exposure time measuring unit (exposure time measuring counter) 24 measures the length of time from the start of exposure to the moment at which the exposure stops, to thereby measure the actual exposure time in the imager 1. In response to a start command of an exposure start unit 23, the imager 1 starts the exposure and, at the same time, the exposure time measuring counter 24 starts counting. Subsequently, an output of the comparator 111 (8), shown in FIG. 2 and implemented in the imager 1, and an output of a logical add calculation 002 (10) shown in FIG. 5 are handled as an exposure stopping output, the counting is then halted and the exposure time is outputted.

Figure 9:
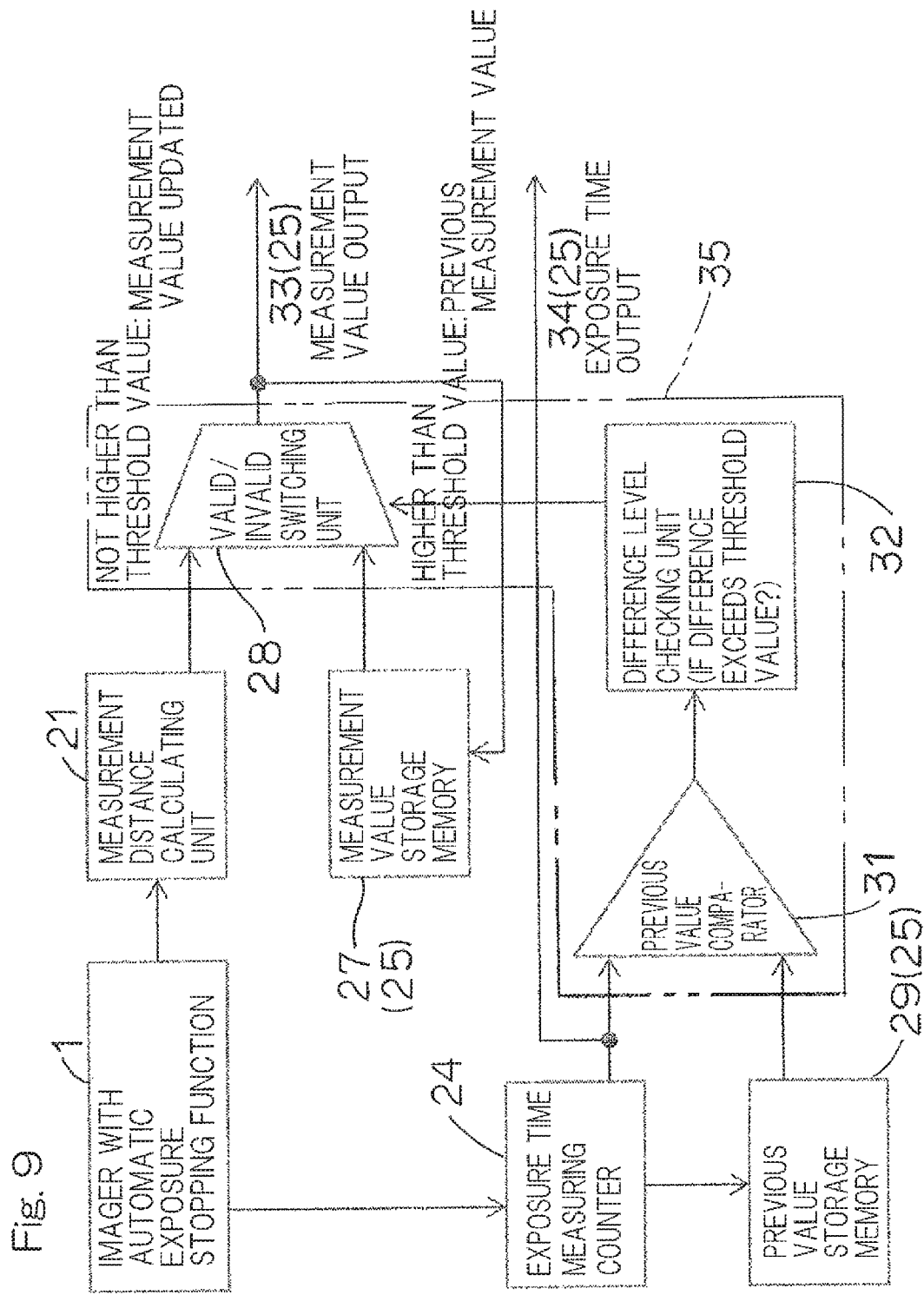
FIG. 9 is a block diagram showing a comparison of the exposure time and an update/keeping process of the measurement value.

FIG. 9 illustrates a brock diagram showing a comparison of the exposure time and an update/keeping process of data related with acquisition of the distance actual value. Besides the imager 1 and the exposure time measuring counter 24, it includes the measurement distance calculating unit 21, a measurement value storage memory 27 for storing a measurement distance, a valid/invalid switching unit 28, a previous value storage memory 29 for storing the previous exposure time measured previously, a previous value comparator 31 for comparing the currently measured exposure time with the previously measured exposure time, and a difference level checking unit 32 for checking whether or not the difference thereof is higher than a specified value (threshold value). The valid/invalid switching unit 28, the previous value comparator 31 and the difference level checking unit 32 cooperate with each other to form the distance actual value measuring unit 35. Also, the measurement value storage memory 27, the previous value storage memory 29, and the measurement value output 33 for outputting a measured actual value and an exposure time output 34 for outputting the exposure time cooperate with each other to form the data output • storage unit 25.

As shown in FIG. 9, in the event that using the exposure time so measured, the difference between it and the preceding exposure time is great in the previous value comparator 31, it is regarded that the reflectance of the object M has changed dramatically, that is, a measurement error is many, the preceding (previous) measurement value, rather than using the measurement value at that time, is kept and outputted by the valid/invalid switching unit 28 so that increase of the error in measurement value can be suppressed. If it is lower than the threshold value, it is regarded as no measurement error present and the measurement value is therefore updated and then kept and outputted.

Figure 10:
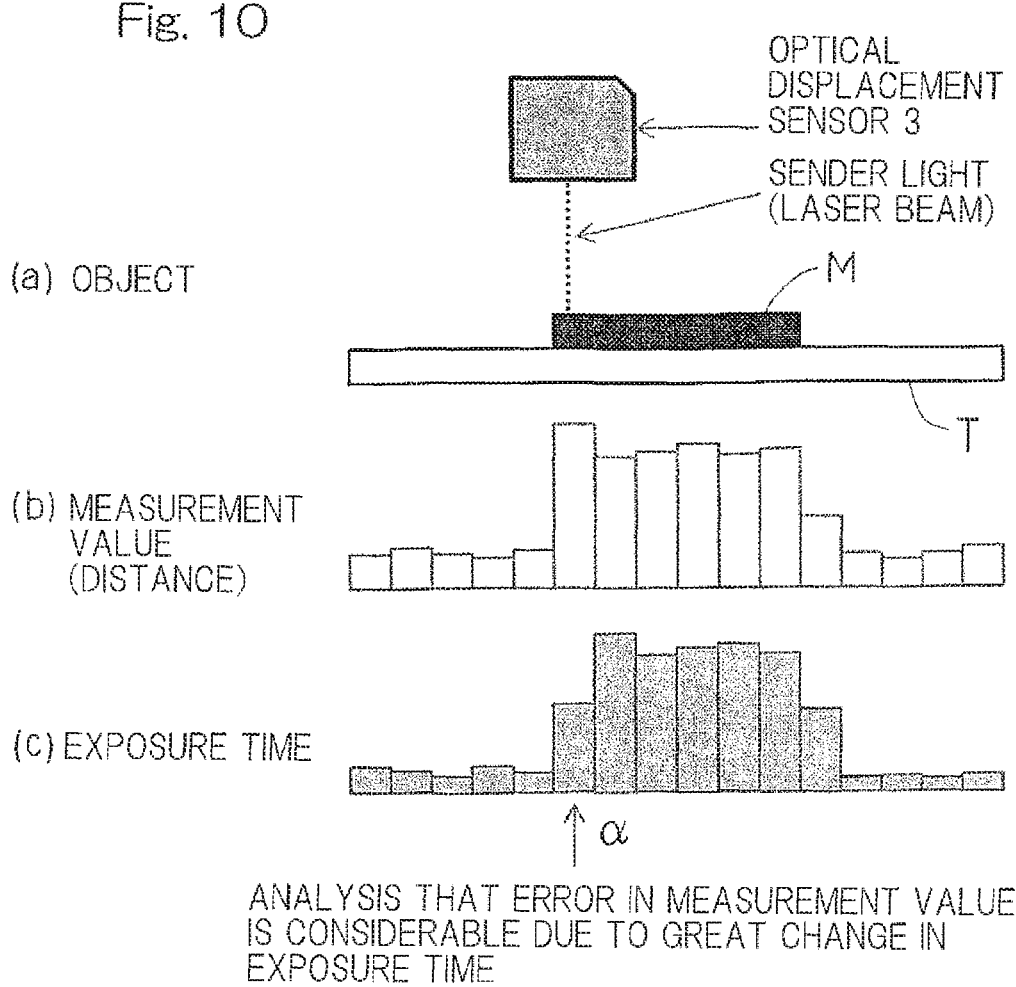
FIG. 10 is a time chart showing the operation of FIG. 9.

FIG. 10 illustrates a time chart showing the operation of FIG. 9. Chart (a) of FIG. 10 represents a measuring state of the object, chart (b) represents the measurement value (distance), and chart (c) represents the exposure time. As shown in chart (a) of FIG. 10, on a white background having a high light reflecting level as the object T, a small, black object M having a low light reflecting level is placed, and scanned by the optical displacement sensor 3. The measurement value, as shown in chart (b), at the time the light of the optical displacement sensor 3 reaches the black object M, and the current exposure time as shown in chart (c) are measured. Since the light reflectance from the object T to the object M decreases dramatically, the exposure time becomes long as shown by α. In this way, simultaneously, by keeping • outputting the data on the exposure time together with the measurement value, it beneficially assists in analyzing an error factor of the measurement value. In such case, since the change of the exposure time is considerable, that the measurement error of the object M is great in the presence of a background, in which the light reflectance is markedly different, is analyzed.

Figure 11:
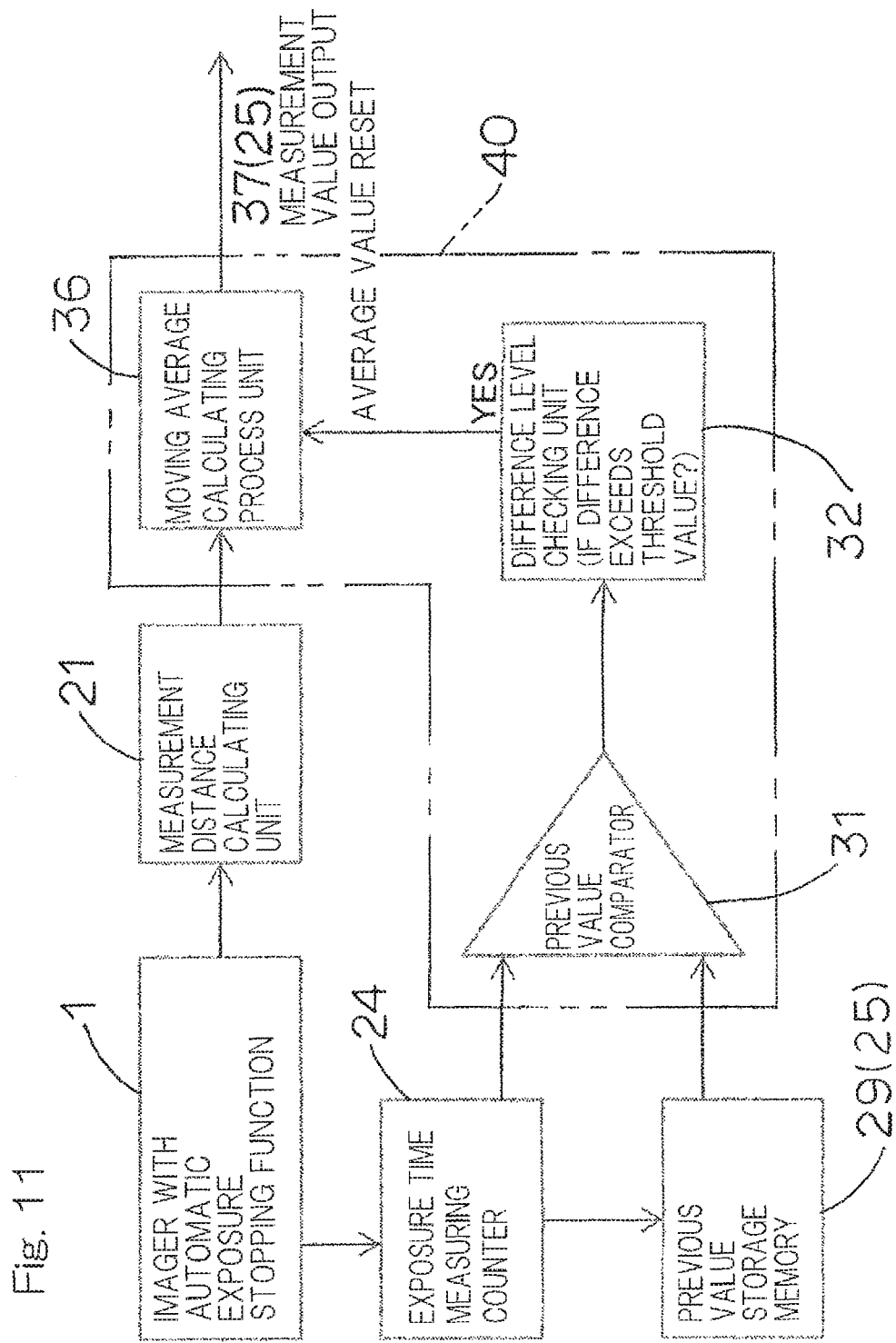
FIG. 11 is a block diagram showing another example.

FIG. 11 illustrates a block diagram showing the comparison of the exposure time in another example and the update/keeping process of the measurement value. In this example, it includes a moving average calculation processing unit 36, besides the imager 1, the measurement distance calculating unit 21, the exposure time measuring counter 24, the previous value storage memory 29, the previous value comparator 31 and the difference level checking unit 32, as shown in FIG. 9. The moving average calculation processing unit 36, the previous value comparator 31 and the difference level checking unit 32 cooperate with each other to form a distance actual value measuring unit 40. This distance actual value measuring unit 40 measures a distance actual value by reducing the moving average cycles of multiple measurement distances, in the event that the exposure time so measured, when compared with the previous exposure time to calculate a difference thereof, is greater than the specified value.

In the optical displacement sensor, it is quite often that the moving average process is generally performed in order to stabilize the measurement value, but in this example, as shown in FIG. 11, the moment at which the exposure time changes dramatically is regarded as a change of the condition of the object M and, hence, by the moving average calculation process unit 36, the moving average process is reset to allow it to respond quickly to the change of the object M while the moving average process is performed.

Figure 12:
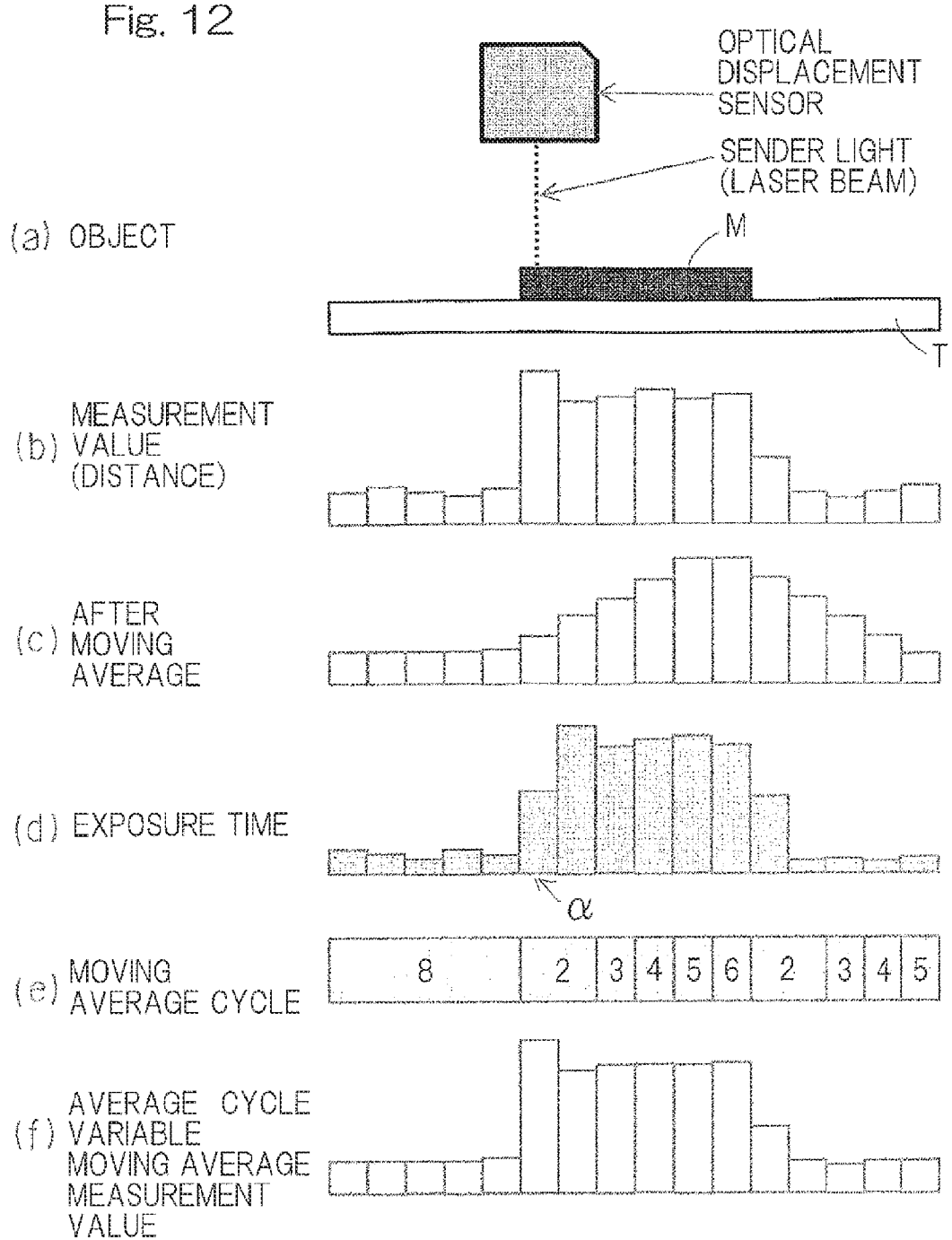
FIG. 12 is a time chart showing the operation of FIG. 11.
Figure 13:
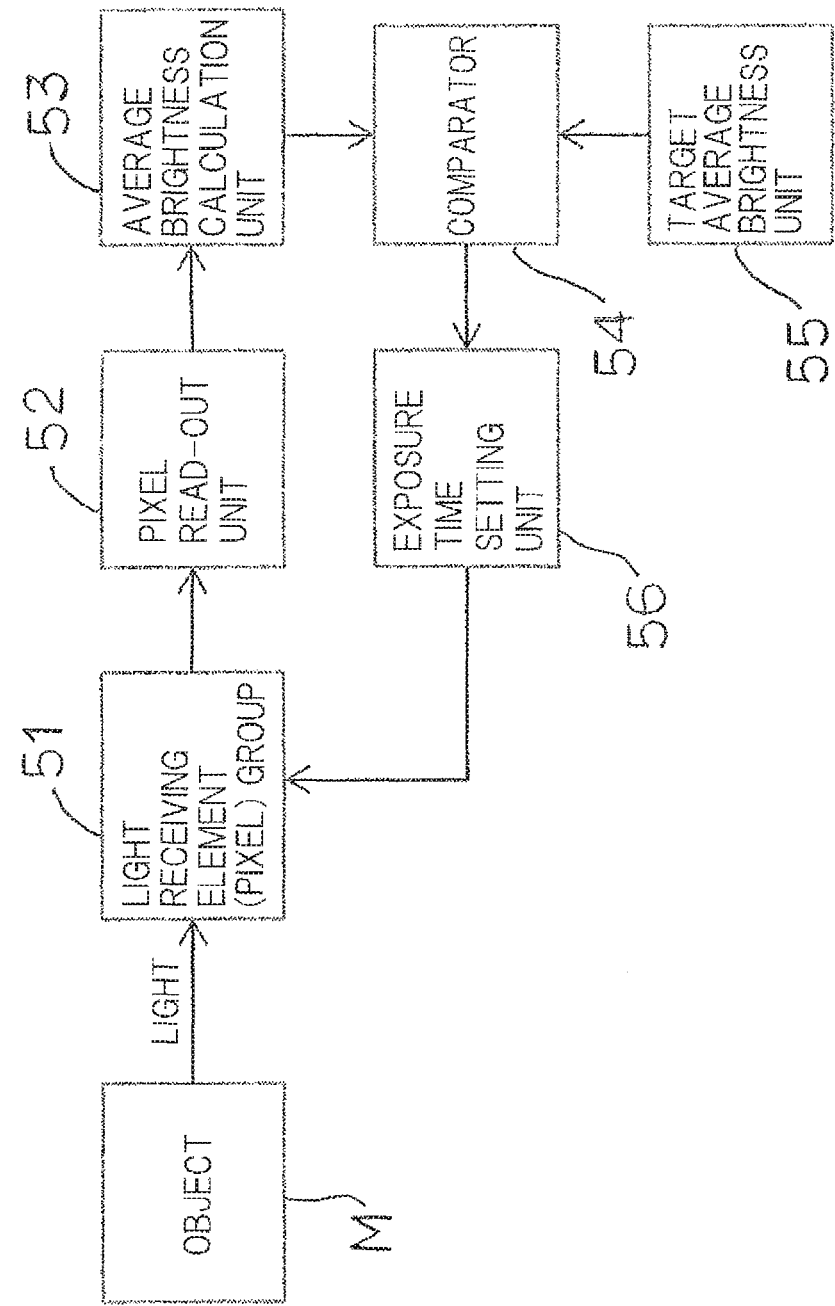
FIG. 13 is a block diagram showing an automatic exposure function used in the conventional imaging device.
Figure 15A:
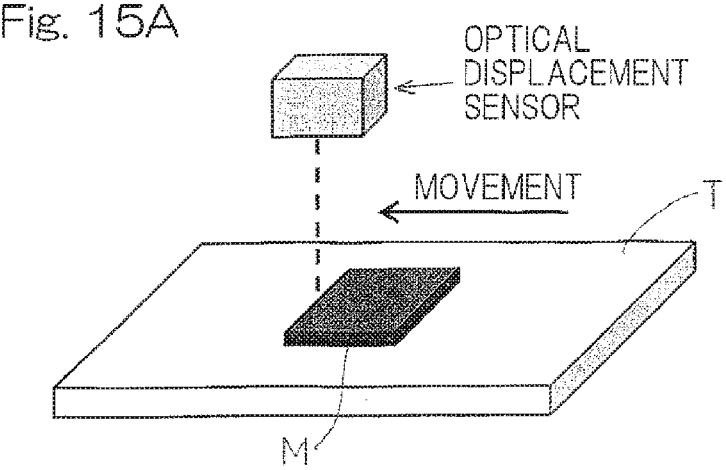
FIGS. 15A and 15B are a diagram showing an example applicable where the reflection amount of an object changes dramatically.
Figure 15B:
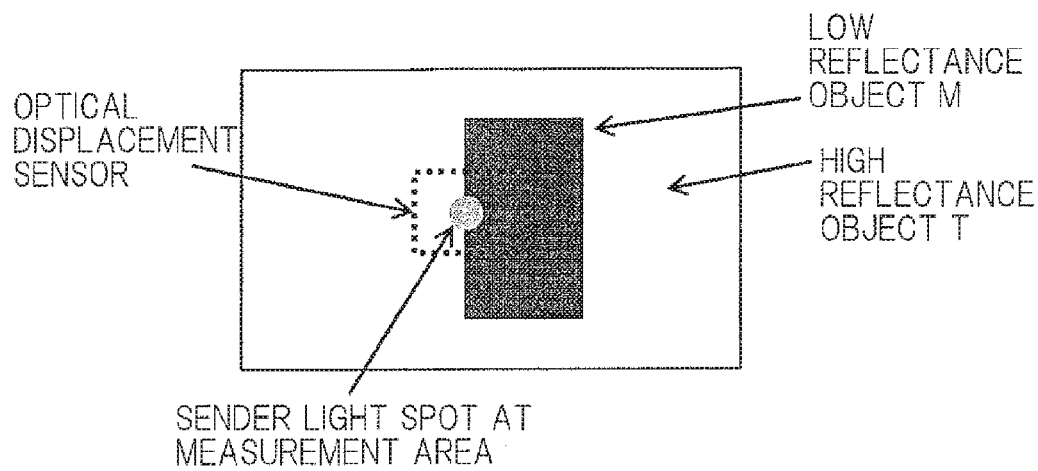

FIG. 12 illustrates a time chart showing the operation of FIG. 11, by which the operation of the moving average process reset is explained. Chart (a) of FIG. 12 represents a measuring state of the object, chart (b) represents the measurement value (distance), and chart (c) represents after the movement averaging, chart (d) represents the exposure time, chart (e) represents the moving average cycle, and chart (f) represents the moving average measurement value of the average cycle variable. As in chart (b), when the light of the optical displacement sensor 3 reaches the black object (object) M, a change of the measurement distance thereof appears in the actual measurement value before the moving average. As in chart (c), the measurement value after the moving average, the measurement value after the movement averaging changes gradually to a linear shape subsequent to the timing of arrival at the black object M, finally indicating the actual distance. This transit time depends on a measurement cycle of the moving average cycles. As in chart (d), at the timing of arrival at the black object M, the reflectance from the object T to the object M decreases dramatically and, therefore, the exposure time of the optical displacement sensor 3 becomes long (shown by α).

As shown in chart (e) of FIG. 12, if the change of the exposure time is detected and the cycle of the moving average is reduced, the distance thereof can be outputted immediately after the arrival at the black object M. It is to be noted that since the number of data for the moving average is small immediately after the arrival, an effect of the moving average is not enough. The moving average cycle once reduced is incremented by one each time the measurement is executed, and the summation stops at the timing at which the original moving average cycle is reached. Although originally the moving average cycle is eight as in chart (e), it is two cycles due to the change of the exposure time and a condition in which it is incremented by one each time the measurement is executed thereafter is shown.

In this example, while the moving average process is performed, even though the light reflecting level from the object M changes dramatically, not only can the actual measurement value be easily measured, but also the measurement response time of the object M can be sped up.

It is to be noted that in describing the preferred embodiment of the present invention, the optical displacement sensor has been shown and described as made to measure the distance from the object, the present invention is not necessarily limited thereto and the optical measurement meter of the present invention can be used to measure the thickness, warping and/or step.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Imager
3 . . . Optical displacement sensor
5 . . . Photoelectric pixel
6 . . . Light receiving level monitoring unit under exposure
7 . . . Light receiving level upper limit value specifying unit
8 . . . Comparator
10 . . . Logic circuit
11 . . . Exposure stopping control circuit
12 . . . Pixel read-out unit at the time of stopping of exposure
21 . . . Measurement distance calculating unit
24 . . . Exposure time measuring unit
25 . . . Data output/storage unit
35, 40 . . . Distance actual value measuring unit
36 . . . Moving average calculating process unit
50 . . . Pixel block

What is claimed is:

1. An optical displacement sensor, which comprises:
an imager having multiple pixel blocks, each of the pixel blocks including a group of pixels to receive light from an object, a light receiving level upper limit value specifying unit to specify a light receiving level upper limit for all of the pixels and multiple comparator to compare the specified upper limit value with the light receiving level of each pixel during exposure, the imager further including a logic circuit to logically add an output of each of the comparators, the imager being operable to stop exposure of all of the pixels in accordance with a result of calculation of the logical add;
an exposure time measuring unit in the imager to measure an exposure time from a start of exposure to stopping of the exposure;
a measurement distance calculating unit to calculate a measurement distance to the object on the basis of a displacement of a light receiving position in the imager; and
a data output/storage unit to output and/or store, as data related with acquisition of a distance actual value, which is an actual distance to the object, in a condition in which the measured exposure time and the measurement distance calculated with this exposure time are associated with each other.

2. The optical displacement sensor as claimed in claim 1, further comprising a distance actual value measuring unit to measure a distance actual value which is the actual distance to the object, the distance actual value measuring unit being operable to measure the distance actual value by invalidating the calculated measurement distance corresponding to such measured exposure time in the event that the measured exposure time, when compared with the previous value to calculate a difference, is higher than a specified value, but by enabling the calculated measurement distance corresponding to the previous exposure time.

3. The optical displacement sensor as claimed in claim 1, further comprising a distance actual value measuring unit to measure a distance actual value which is the actual distance to the object, the distance actual value measuring unit being operable to measure a distance actual value by reducing the moving average cycles of multiple measurement distances, in the event that the exposure time so measured, when compared with the previous value to calculate a difference thereof, is greater than the specified value.

* * * * *